Figure 1:
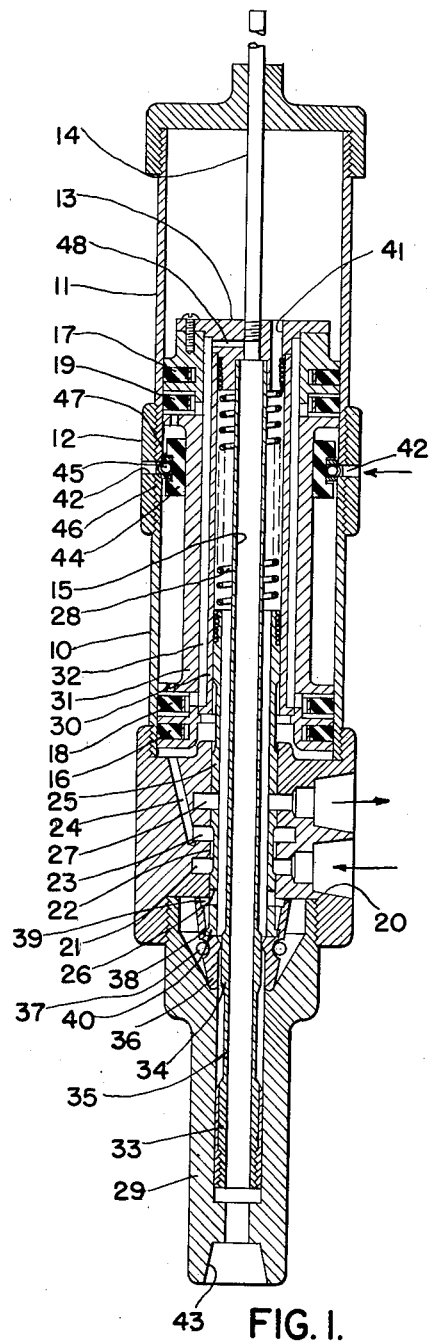

Aug. 7, 1962

C W. MUSSER 3,048,115

DOUBLE ACTION PUMP AND ENGINE

Filed April 20, 1960

INVENTOR.
C WALTON MUSSER

ATTORNEYS:

United States Patent Office 3,048,115
Patented Aug. 7, 1962

3,048,115
DOUBLE ACTION PUMP AND ENGINE
C Walton Musser, 66 McKay St., Beverly, Mass.
Filed Apr. 20, 1960, Ser. No. 23,584
7 Claims. (Cl. 103—48)
(Granted under Title 35, U.S. Code (1952), sec. 266)

The invention described herein may be manufactured and used by or for the Government for governmental purposes without the payment to me of any royalty thereon.

This invention relates to devices which are operated by a fluid pressure to pump a fluid from one point to another, and more especially to an improved device wherein a fluid pressure engine and a fluid pump are combined into a compact unitary structure.

This device is susceptible of use wherever it is desired to utilize the pressure of one fluid to pump another fluid. If the device is operated by a hot gas, such as the exhaust gas of a motor vehicle, it automatically heats the pumped gas or fluid. An important use of the device is to circulate the fluid within a motor vehicle cooling system to keep the engine preheated while idle in arctic service. Other uses will be apparent to those skilled in the art.

The invention will be better understood from the following description when considered in connection with the accompanying drawings and its scope is indicated by the appended claims.

Figure 2:
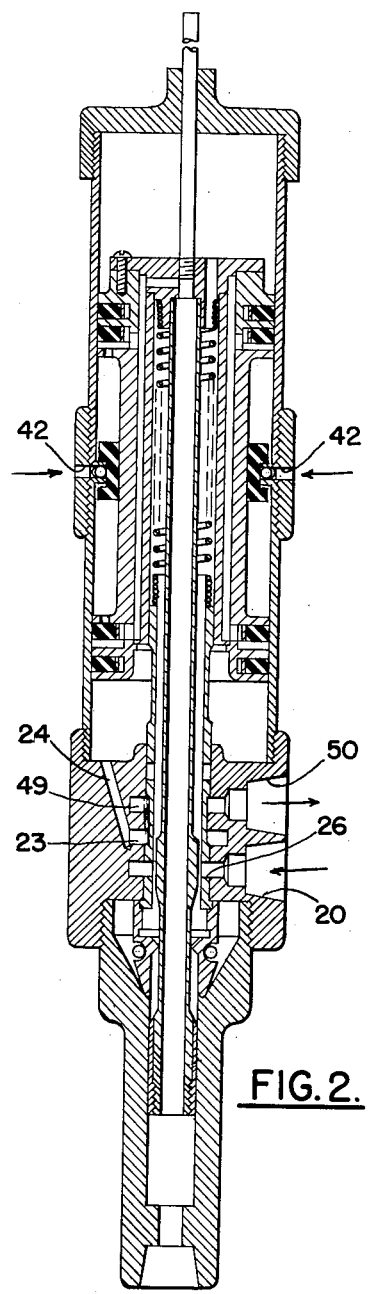

Referring to the drawings:

FIG. 1 illustrates the positions of the various parts of the device at the end of the backward stroke of the piston, and FIG. 2 shows the valve position during the forward travel of the piston.

As indicated by these figures, the device includes a two-part cylinder 10—11 joined together by a collar 12. Movable within the cylinder 10—11 is a piston 13 which is fixed to a rod 14 and to a central tube 15. Fixed to the piston 13 near its opposite ends are piston rings 16 and 17. In frictional engagement with the cylinder 10—11 and arranged to be moved by the piston 13 are rings 18 and 19 which function in connection with the pumped fluid as hereinafter explained.

Connected between the piston 13 and a slidable valve 25 is a spring 28 which is relaxed when the piston is at the midpoint of its travel.

The central tube 15 terminates in a support 29, has raised parts 33 and 34 and a reduced part 35. These parts are arranged to cooperate with a collet-shaped clutch 36 for holding the valve 25 stationary during the travel of the piston. To this end, the parts 36 are encircled by a garter spring 37 and have grooves 38 and 39 adapted to engage an enlargement 40 at the end of the slide valve 25.

FIG. 1 illustrates the device as at the instant of stroke reversal. Here the raised part 34 of the tube 15 has just opened the collet 36 so that the valve 25 has snapped into its illustrated position with its raised part 40 in alinement with groove 38 of the collet.

Under these conditions, fluid under pressure is applied through an opening 20, annular enclosures 21, 22 and 23 and a duct 24 to the rear end of the piston 13.

As the piston moves, the collet 36 rides down into the undercut part 35 of the tube 15 so that the groove 38 interlocks with the end 40 of the valve 25 and holds it stationary, thus tensioning the spring 28.

When the piston reaches the end of its travel, the collet 36 rides up onto the raised part 33 of the tube 15. This releases the valve 25 which is snapped into the position indicated by FIG. 2. Under these conditions, driving fluid under pressure is applied through openings 20 and 26, the annular space between the valve 25 and the tube 15 and openings 41 to the forward face of the piston 13 which is forced back to the position indicated by FIG. 1. During this return stroke, fluid at the rear of the piston is forced through duct 24 annular slots 23 and 49 and outlet 50. During the forward stroke of the piston, the gas ahead of it is discharged through the opening 41, the annular space between the tubes 15 and 30, and the outlet 50. As previously indicated, this has the advantage that the driving fluid may be utilized to heat the pumped fluid. This completes the operating cycle of the engine element of the device.

The fluid pumped by this engine enters through openings 42 and is discharged through outlet 43. This transfer of the pumped fluid is effected by three different valve elements one of which is restrained in its movement by frictional engagement with the exterior of the piston 13 and the other two of which are restrained in their movement by frictional engagement with the interior surface of the cylinder 10—11.

Controlling the fluid pumped in through the openings 42 is a valve including a channel-shaped ring 44 which is encircled by a garter spring 45, has its top slightly spaced from the cylinder 10—11, has its bottom in frictional engagement with the body 31 of the piston, and co-operates with apertured rings 46 and 47 which are fixed to the cylinder 10—11.

The rings 18 and 19 are in frictional engagement with the interior of the cylinder 10—11, as previously indicated, and function in response to movement of the piston to open and close openings in the flanged ends of the part 31 of the piston 13.

With the piston moving forward from the position indicated by FIG. 1, the ring 44 is against the ring 46 and away from the ring 47, the ring 19 is against one end of the part 31 and the ring 18 is spaced from the other end of the part 31. Under these conditions, the pumped fluid is being drawn into the forward end of the annular space between the cylinder and the body of the piston and forced out of the rear end of this space through passageways 32 and 48 and the tube 15 to outlet 43. When movement of the piston 13 is reversed, the pumped fluid is similarly discharged from the forward end of the annular space between the cylinder and the body of the piston as will be understood without detailed explanation.

I claim:

1. The combination of a cylinder having at its rear end a closure with a plurality of interior annular grooves and a duct constituting a path into said cylinder, a piston reciprocable within said cylinder, said piston being hollow and having at its forward end a closure with an opening therethrough, a tube fixed to said piston, a valve arranged between said tube and said piston to form an annular passageway constituting with said opening a path into the forward end of said cylinder, said valve being movable to admit driving fluid to the opposite ends of said piston through said paths, resilient means connected between said piston and said valve so as to be relaxed at the midpoint in the travel of said piston, coupling means between said valve and said piston for releasing said valve to control by said resilient means only when said piston is near an end of its travel, and means for driving a pumped liquid through said tube in response to movement of said piston said pumped liquid driving means including a valve element moved through frictional contact with the exterior periphery of said piston.

2. The combination of a cylinder having at its rear end a closure with a plurality of interior annular grooves and a duct constituting a path into said cylinder, a piston reciprocable within said cylinder, said piston being hollow and having at its forward end a closure with an opening therethrough, a tube fixed to said piston, a valve arranged between said tube and said piston to form an annular passageway constituting with said opening a path into the forward end of said cylinder, said valve being movable to admit driving fluid to the opposite ends of said piston through said paths, resilient means connected between said piston and said valve so as to be relaxed at the midpoint in the travel of said piston, coupling means between said valve and said piston for releasing said valve to control by said resilient means only when said piston is near an end of its travel, and means for driving a pumped liquid through said tube in response to movement of said piston, said pumped liquid driving means including a valve element moved by said piston in frictional contact with the interior periphery of said cylinder.

3. The combination of a cylinder having at its rear end a closure with a plurality of interior annular grooves and a duct constituting a path into said cylinder, a piston reciprocable within said cylinder, said piston being hollow and having at its forward end a closure with an opening therethrough, a tube fixed to said piston, a valve arranged between said tube and said piston to form an annular passageway constituting with said opening a path into the forward end of said cylinder, said valve being movable to admit driving fluid to the opposite ends of said piston through said paths, resilient means connected between said piston and said valve so as to be relaxed at the midpoint in the travel of said piston, coupling mean between said valve and said piston for releasing said valve to control by said resilient means only when said piston is near an end of its travel, and means for driving a pumped liquid through said tube in response to movement of said piston, said pumped liquid driving means including a first valve element moved through frictional contact with the outer periphery of said piston and a second valve element moved by said piston in frictional contact with interior periphery of said cylinder.

4. The combination of a cylindrical body having pump driving fluid and pumped fluid inlet and outlet ports and a plurality of passageways interconnected therewith, a hollow piston movable in said cylindrical body and having a closure at its forward end, a valve member extending into said piston and movable to complete openings from said pumping fluid inlet and outlet ports through said passageways to the opposite ends of said piston, resilient means urging said valve member away from said closure, a tube fixed to said closure and extending rearwardly through and out of said piston and valve member, said tube having raised and undercut areas, spring biased means operated by engagement with said undercut area to lock said valve member to said tube during the forward stroke of said piston and by engagement with said raised area to unlock said valve member from said tube upon the completion of said forward stroke, and means actuated by said piston for driving a pumped fluid from said pumped fluid inlet to said pumped fluid outlet.

5. A combination according to claim 4 wherein said tube has an exterior flange at its rear end and said spring biased means is a collet having a groove adapted to engage said flange.

6. The combination of a cylinder having at its rear end a closure with a plurality of interior annular grooves and a duct constituting a path into said cylinder, a piston reciprocable within said cylinder and having exterior undercut areas at its center and opposite ends, said piston being hollow and having at its forward end a closure with an opening therethrough a valve spaced from said tube to form an annular passageway constituting with said opening a path to the forward end of said cylinder, said valve being movable to admit a pump driving fluid to the opposite ends of said piston through said paths, resilient means connected between said piston and said valve so as to be relaxed at the midpoint in the travel of said piston, means arranged between said valve and said piston to release said valve to control by said resilient means only when said piston is near the end of its travel, and pumped fluid acutating means including a channel-shaped member located in said center undercut area and movable by friction between it and said piston to admit pumped fluid to its opposite sides, and rings located in said end undercut areas in frictional engagement with said cylinder and actuated by said piston to eject said pumped fluid from said center undercut area.

7. A combination according to claim 6 wherein said valve releasing means includes a tube fixed to said piston and extending therethrough and said pumped fluid is discharged through said tube.

References Cited in the file of this patent
UNITED STATES PATENTS

| | | |
|---|---|---|
| 1,588,561 | Tucker | June 15, 1926 |
| 2,442,916 | Buchanan | Jan. 8, 1948 |
| 2,630,070 | Davis | Mar. 3, 1953 |
| 2,839,004 | Carlisle | June 17, 1958 |